United States Patent
Kim et al.

(10) Patent No.: US 8,609,802 B2
(45) Date of Patent: Dec. 17, 2013

(54) PRODUCTION METHOD FOR A WHOLLY AROMATIC LIQUID CRYSTALLINE POLYESTER RESIN, A WHOLLY AROMATIC LIQUID CRYSTALLINE POLYESTER RESIN PRODUCED BY MEANS OF THE METHOD, AND A COMPOUND OF THE WHOLLY AROMATIC LIQUID CRYSTALLINE POLYESTER RESIN

(75) Inventors: Hyun Min Kim, Daejeon (KR); Jong Hwa Yun, Daejeon (KR); Mahn Jong Kim, Daejeon (KR)

(73) Assignee: Samsung Fine Chemicals Co., Ltd. (KR)

( * ) Notice: Subject to any disclaimer, the term of this patent is extended or adjusted under 35 U.S.C. 154(b) by 0 days.

(21) Appl. No.: 13/521,618

(22) PCT Filed: Jan. 12, 2011

(86) PCT No.: PCT/KR2011/000202
§ 371 (c)(1),
(2), (4) Date: Jul. 11, 2012

(87) PCT Pub. No.: WO2011/087263
PCT Pub. Date: Jul. 21, 2011

(65) Prior Publication Data
US 2013/0137845 A1 May 30, 2013

(30) Foreign Application Priority Data
Jan. 12, 2010 (KR) .......................... 10-2010-0002764

(51) Int. Cl.
*C08G 64/00* (2006.01)
*C08G 63/02* (2006.01)

(52) U.S. Cl.
USPC ........... 528/271; 528/176; 528/190; 528/193; 528/194; 528/272

(58) Field of Classification Search
USPC .................. 528/176, 190, 193, 194, 271, 272
See application file for complete search history.

(56) References Cited

U.S. PATENT DOCUMENTS

| 5,466,765 A | 11/1995 | Haseltine et al. |
| 6,140,458 A | 10/2000 | Terado et al. |
| 6,232,435 B1 | 5/2001 | Heitz et al. |
| 8,222,802 B2 * | 7/2012 | Saito et al. .................... 313/113 |

FOREIGN PATENT DOCUMENTS

GB 1182393 2/1970

OTHER PUBLICATIONS

International Search Report—PCT/KR2011/000202 dated Sep. 26, 2011.
Written Opinion—PCT/KR2011/000202 dated Sep. 26, 2011.

* cited by examiner

*Primary Examiner* — Terressa Boykin
(74) *Attorney, Agent, or Firm* — Cantor Colburn LLP

(57) ABSTRACT

Disclosed are a production method for a wholly aromatic liquid crystalline polyester resin, a wholly aromatic liquid crystalline polyester resin produced using the method, and a compound of the wholly aromatic liquid crystalline polyester resin. The disclosed production method for a wholly aromatic liquid crystalline polyester resin comprises the steps of synthesizing a wholly aromatic liquid crystalline polyester resin by synthesizing a wholly aromatic liquid crystalline polyester prepolymer by a condensation polymerization of a monomer and then reducing the pressure inside a reaction vessel containing the synthesized prepolymer at a predetermined internal pressure reduction rate of the reaction vessel.

4 Claims, No Drawings

PRODUCTION METHOD FOR A WHOLLY AROMATIC LIQUID CRYSTALLINE POLYESTER RESIN, A WHOLLY AROMATIC LIQUID CRYSTALLINE POLYESTER RESIN PRODUCED BY MEANS OF THE METHOD, AND A COMPOUND OF THE WHOLLY AROMATIC LIQUID CRYSTALLINE POLYESTER RESIN

TECHNICAL FIELD

The present disclosure relates to a method of preparing a wholly aromatic liquid crystalline polyester resin, a wholly aromatic liquid crystalline polyester resin prepared by means of the method, and a compound of the wholly aromatic liquid crystalline polyester resin. More particularly, the present disclosure relates to a method of preparing a wholly aromatic liquid crystalline polyester resin, the method including synthesizing the wholly aromatic liquid crystalline polyester resin by synthesizing a wholly aromatic liquid crystalline polyester prepolymer by condensation polymerization of at least one monomer and then reducing an internal pressure of a reaction vessel containing the synthesized prepolymer at a predetermined pressure reduction rate, a wholly aromatic liquid crystalline polyester resin prepared by means of the method, and a compound of the wholly aromatic liquid crystalline polyester resin.

BACKGROUND ART

Wholly aromatic liquid crystalline polyester resin has high heat resistance and high flowability when melted, and thus, is widely used as a material for precision injection molding, particularly in the field of electronic parts. In particular, due to high dimensional stability and high electrical insulating characteristics, the use of wholly aromatic liquid crystalline polyester as materials for electronic material films and substrates is increasing.

Wholly aromatic liquid crystalline polyester resin is a kind of thermoplastic polymer synthesized by condensation polymerization, and thus, if a monomer remains unreacted in the synthesized resin as a result of insufficient condensation polymerization during the synthesis, gassing or carbonization of injection molded products may likely occur in preparing resin compound by extrusion or in manufacturing the injection molded products by injection.

DETAILED DESCRIPTION OF THE INVENTION

TECHNICAL PROBLEM

The present disclosure provides a method of preparing a wholly aromatic liquid crystalline polyester resin, the method including synthesizing the wholly aromatic liquid crystalline polyester resin by synthesizing a wholly aromatic liquid crystalline polyester prepolymer by condensation polymerization of at least one monomer and then reducing an internal pressure of a reaction vessel containing the synthesized prepolymer at a predetermined pressure reduction rate.

The present disclosure provides a wholly aromatic liquid crystalline polyester resin compound prepared by means of the above-described method.

The present disclosure provides a wholly aromatic liquid crystalline polyester resin compound including the wholly aromatic liquid crystalline polyester resin.

TECHNICAL SOLUTION

According to an aspect of the present invention, there is provided a method of preparing wholly aromatic liquid crystalline polyester resin, the method including: synthesizing a wholly aromatic liquid crystalline polyester prepolymer by condensation polymerization of at least two different monomers; and reducing an internal pressure of a reaction vessel containing the prepolymer to remove a byproduct and unreacted monomers and lead to condensation polymerization of the prepolymer, thereby synthesizing the wholly aromatic liquid crystalline polyester resin, wherein an internal pressure reduction rate of the reaction vessel is in a range of about 17~20 torr/min.

In the reducing of the internal pressure of the reaction vessel, a temperature of the reaction vessel may be in a range of about 350~400° C.

The reaction vessel may be equipped with an agitator, and a time for which the reduced internal pressure of the reaction vessel is maintained may be controlled based on a torque value of the agitator.

The reduced internal pressure state of the reaction vessel may be released when the torque value of the agitator reaches about 5~6N·m.

According to another aspect of the present invention, there is provided a wholly aromatic liquid crystalline polyester resin not containing unreacted monomers, wherein the wholly aromatic liquid crystalline polyester resin is prepared by the above-described method. As used herein, the meaning of "not containing unreacted monomers" is that no unreacted monomers are contained at all, and inclusion of a very small amount of unreacted monomers that is so small that carbonization occurred on the surface of injection molded product is indistinguishable.

According to another aspect of the present invention, there is provided a wholly aromatic liquid crystalline polyester resin compound comprising the wholly aromatic liquid crystalline polyester resin of claim 5.

BEST MODE

Hereinafter, methods of preparing wholly aromatic liquid crystalline polyester resin according to embodiments of the present disclosure are described in more detail.

According to an aspect of the present disclosure, a method of preparing a wholly aromatic liquid crystalline polyester resin includes synthesizing a wholly aromatic liquid crystalline polyester prepolymer by condensation polymerization of a monomer or at least two different monomers; and reducing an internal pressure of a reaction vessel containing the prepolymer to remove a byproduct and unreacted monomers and lead to condensation polymerization of the prepolymer, thereby synthesizing the wholly aromatic liquid crystalline polyester resin, wherein an internal pressure reduction rate of the reaction vessel is controlled to about 17~20 torr/min so as to prevent bumping of the contents contained in the reaction vessel. If the pressure reduction rate is less than about 17 torr/min, the condensation polymerization may terminate while the byproduct and unreacted monomers in the contents of the reaction vessel are not sufficiently removed. If the pressure reduction rate is over about 20 torr/min, the byproduct and unreacted monomers in the contents of the reaction vessel may be so rapidly discharged out of the reaction vessel that bumping of the contents of the reaction vessel may occur, resulting in a wholly aromatic liquid crystalline polyester resin with a low degree of polymerization.

The monomers may include at least one compound selected from the group consisting of aromatic diol, aromatic diamine and aromatic hydroxylamine, and aromatic dicarboxylic acid. In some embodiments, the monomers may further include aromatic hydroxy carboxylic acid and/or aromatic amino carboxylic acid.

A condensation polymerization method may be, for example, solution condensation polymerization, bulk condensation polymerization, or the like. Furthermore, to facilitate the condensation polymerization, a monomer (i.e., acylated monomer) that is pretreated with a chemical substance, such as an acylating agent (in particular, acetylating agent) to have enhanced reactivity may be used.

In addition, a metal catalyst may be used to facilitate the condensation polymerization. Examples of the metal catalyst are alkali metals, such as lithium, sodium, potassium, and the like; and oxides, hydroxides, and chlorides of these alkali metals.

The reducing of the pressure inside the reaction vessel is performed to remove the byproduct, such as acetic acid, and unreacted monomers in the contents of the reaction vessel. That is, as the byproduct is removed by reducing the internal pressure of the reaction vessel, the condensation polymerization rate of the wholly aromatic liquid crystalline polyester prepolymer is increased so that a wholly aromatic liquid crystalline polyester resin with a higher degree of polymerization may be obtained, and thus, additional polymerization of the prepolymer, for example, via solid-phase condensation polymerization, becomes unnecessary. Furthermore, as the unreacted monomers are removed by reducing the internal pressure of the reaction vessel, gassing caused due to sublimation of the unreacted monomers or generation of a carbide due to carbonization of the unreacted monomers, which may likely occur in a post-process such as extrusion or injection molding if the wholly aromatic liquid crystalline polyester resin or a compound thereof contains the unreacted monomers, may be suppressed.

The reducing of the internal pressure of the reaction vessel may be performed using a vacuum pump. In particular, the internal pressure of the reaction vessel may be reduced by operating a vacuum pump at a predetermined rate, wherein the vacuum pump is connected to a side of a vacuum trap of which another side is connected to the reaction vessel, the vacuum trap being filled with, for example, liquid nitrogen.

As used herein, the term "bumping" refers to abrupt explosive, vigorous boiling of liquid.

In the reducing of the internal pressure of the reaction vessel, a temperature of the reaction vessel may be in a range of about 350~400° C. If the temperature of the reaction vessel is less than about 350° C., energy may be insufficient for the condensation polymerization, so that plenty of the unreacted monomers may be present in the reaction vessel. If the temperature of the reaction vessel is over about 400° C., the polymer in the reaction vessel may be deteriorated.

The reaction vessel may also be equipped with an agitator that is able to measure a torque value, and the time for which the reduced internal pressure of the reaction vessel is maintained may be controlled based on the torque value of the agitator. In particular, the larger the degree of polymerization becomes in synthesizing the wholly aromatic liquid crystalline polyester resin, the larger the viscosity of the wholly aromatic liquid crystalline polyester resin becomes and the larger the torque value of the agitator becomes. Thus, a correlation is established among the degree of polymerization, the viscosity, and the torque value. If this correlation is previously identified, the operation of the agitator may be terminated when a torque value corresponding to a desired degree of polymerization is reached. Afterward, an inert gas such as nitrogen may be injected into the reaction vessel to release the reaction vessel from the reduced internal pressure state, and then the synthesized wholly aromatic liquid crystalline polyester resin may be discharged out of the reaction vessel. In particular, the reduced internal pressure state of the reaction vessel may be released when the torque value of the agitator reaches about 5~6N·m. If the reduced internal pressure state of the reaction vessel is released before the torque value reaches about 5N·m, the byproduct and unreacted monomers may remain in the synthesized wholly aromatic liquid crystalline polyester resin, leading to a low degree of polymerization and gassing during a post-process. If the reduced internal pressure state of the reaction vessel is released after the torque value reaches over 6N·m, the synthesized wholly aromatic liquid crystalline polyester resin may solidify in the reaction vessel due to excessively high degree of polymerization and may not be smoothly discharged out of the reaction vessel. If bumping of the reactants occurs in the reaction vessel when the internal pressure of the reaction vessel is reduced, an abrupt increase in torque value of the agitator may unintentionally release the reduced internal pressure state of the reaction vessel. As a result, the synthesized wholly aromatic liquid crystalline polyester resin may disadvantageously have a low degree of polymerization.

According to an aspect of the present disclosure, a wholly aromatic liquid crystalline polyester resin prepared using the above-described wholly aromatic liquid crystalline polyester resin method does not contain a byproduct and unreacted monomers, and thus, does not generate gas during extrusion.

The wholly aromatic liquid crystalline polyester resin prepared as described above may include various repeating units in a molecular chain thereof. Examples of these repeating units are:

(1) Repeating unit derived from aromatic diol:

(2) Repeating unit derived from aromatic diamine:

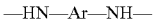

(3) Repeating unit derived from aromatic hydroxylamine:

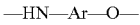

(4) Repeating unit derived from aromatic dicarboxylic acid:

(5) Repeating unit derived from aromatic hydroxy carboxylic acid:

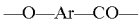

(6) Repeating unit derived from aromatic amino carboxylic acid:

In the formulae of the repeating units, Ar may be an aromatic compound selected from the group consisting of phenylene, biphenylene, naphthalene, or two phenylene connected to each other by carbon or a non-carbon element, or an aromatic compound selected from the group consisting of phenylene, biphenylene, naphthalene, or two phenylene connected to each other by carbon or a non-carbon element in which at least one hydrogen atom is substituted with other elements.

According to another aspect of the present disclosure, there is provided a method of preparing a wholly aromatic liquid crystalline polyester resin compound, the method including the above-described wholly aromatic liquid crystalline polyester resin method.

In some embodiments, the method of preparing a wholly aromatic liquid crystalline polyester resin compound may include: synthesizing a wholly aromatic liquid crystalline polyester prepolymer by condensation polymerization of a monomer or at least two different monomers; reducing an internal pressure of a reaction vessel containing the prepolymer to a rate of about 17~20 torr/min to remove a byproduct and unreacted monomers and lead to condensation polymerization of the prepolymer, so as to obtain the wholly aromatic liquid crystalline polyester resin; and mixing the synthesized wholly aromatic liquid crystalline polyester resin and an additive in a predetermined ratio and then melt-kneading the resultant, thereby preparing a wholly aromatic liquid crystalline polyester resin compound.

The additive may include an inorganic filler and/or an organic filler. Examples of the inorganic filler are glass fiber, talc, calcium carbonate, mica, clay, and mixtures of at least two thereof. The organic filler may be carbon fiber. The inorganic filler and the organic filler may improve mechanical strength of an injection molded product produced from the wholly aromatic liquid crystalline polyester resin compound by injection molding.

The melt-kneading may be performed using a batch mixer, a twin-screw extruder, a mixing roll, or the like. To facilitate the melt-kneading, a lubricant may be used during the melt-keading.

The wholly aromatic liquid crystalline polyester resin compound prepared using the above-described method of preparing a wholly aromatic liquid crystalline polyester resin compound substantially does not contain unreacted monomers, so that neither gassing occurs during injection molding nor carbide is generated.

MODE OF THE INVENTION

Hereinafter, one or more embodiments of the present disclosure will be described in more detail with reference to the following examples. However, these examples are not intended to limit the scope of the present disclosure.

EXAMPLES

Example 1

(1) Preparation of Wholly Aromatic Liquid Crystalline Polyester Resin 1,416 g (10.25 mole) of 4-hydroxy benzoic acid, 195 g (1.04 mole) of 6-hydroxy-2-naphthoic acid, 381 g (2.05 mole) of 4, 4-dihydroxydiphenyl, 482 g (2.90 mole) of 1,4-benzene dicarboxylic acid, 93 g (0.85 mole) of p-aminophenol, 1,850 g (18.12 mole) of acetic anhydride, and 0.154 g of potassium acetate as a catalyst (60 wtppm of potassium ion based on a total amount of monomers) were put into a temperature-controllable 10L-batch-type reaction vessel equipped with a torque-measurable agitator, wherein a vacuum trap and a vacuum pump are sequentially connected to the reaction vessel, followed by injection of nitrogen gas into the reaction vessel to create an inert internal condition in the reaction vessel. Next, a temperature of the reaction vessel was increased to about 150° C. over about 30 minutes while stirring the contents in the reaction vessel, and then was maintained at a temperature for 2 hours to acetylate alcohol groups of the monomers. Subsequently, while removing acetic acid (i.e., a byproduct from the acetylation reaction) by condensation, the temperature of the reaction vessel was increased to about 300° C. at a rate of 1° C./min to further lead to condensation polymerization of the monomers, thereby preparing a wholly aromatic liquid crystalline polyester prepolymer. Acetic acid produced as a byproduct during the preparation of the prepolymer was also continuously removed during the preparation of the prepolymer, together with the acetic acid generated from the acetylation reaction. Subsequently, an internal pressure of the reaction vessel was reduced to about 5 torr at a rate of about 17 torr/min by operating the vacuum pump, and then was maintained at that pressure, and the operation of the vacuum pump was stopped when the torque value of the agitator reached about 6N·m. Afterward, nitrogen gas was injected into the reaction vessel to release the reduced pressure state of the reaction vessel. The time for which the internal pressure of the reaction vessel was maintained at about 5 torr until the release of the reduced pressure state was about 20 minutes. As a result, a wholly aromatic liquid crystalline polyester resin was obtained. The wholly aromatic liquid crystalline polyester resin was recovered from the reaction vessel, and cooled to solidify.

(2) Preparation of Wholly Aromatic Liquid Crystalline Polyester Resin Compound

The wholly aromatic liquid crystalline polyester resin prepared in (1) above and glass fiber (ground glass fiber having a diameter of about 10 μM and an average length of about 150 μm) were mixed in a ratio of 6:4 by weight, and further melt-kneaded using a twin-screw extruder (L/D: 40, diameter: 20 mm), thereby preparing a wholly aromatic liquid crystalline polyester resin compound. During the preparation of the wholly aromatic liquid crystalline polyester resin compound, the twin-screw extruder was evacuated to remove byproducts.

Example 2

A wholly aromatic liquid crystalline polyester resin and a compound of the resin were prepared in the same manner as in Example 1, except that the internal pressure reduction rate was varied to about 20 torr/min. The time for which the internal pressure of the reaction vessel was maintained at about 5 torr until the release of the reduced pressure state was about 22 minutes.

Comparative Example 1

A wholly aromatic liquid crystalline polyester resin and a compound of the resin were prepared in the same manner as in Example 1, except that the internal pressure reduction rate was varied to about 10 torr/min. The torque value of the agitator reached about 6N·m at an internal pressure of the reaction vessel of about 20 torr, and then the reduced pressure state of the reaction vessel was released.

Comparative Example 2

A wholly aromatic liquid crystalline polyester resin and a compound of the resin were prepared in the same manner as in Example 1, except that the internal pressure of the reaction vessel was varied to about 30 torr/min. The time for which the internal pressure of the reaction vessel was maintained at about 5 torr until the release of the reduced pressure state was about 13 minutes.

Evaluation Example

Observation Whether Bumping Occurred when the Internal Pressure of the Reactor was Reduced After fully eliminating the wholly aromatic liquid crystalline polyester resins prepared in Examples 1-2 and Comparative Examples 1 and 2 from the reaction vessel, the reaction vessel was opened to observe whether bumping occurred or not during the preparation of each of the wholly aromatic liquid crystalline polyester resins. The results are shown in Table 1. In Table 1, ○ indicates occurrence of bumping, and x indicates non-occurrence of bumping. In particular, it was determined that bumping occurred if the top as well as the bottom of the agitator were contaminated with the contents of the reaction vessel. It was determined that bumping did not occur if the contents of the reaction vessel was stuck to only the bottom of the agitator immersed in the contents of the reaction vessel from the beginning.

(Measurement of Melt Viscosity)

Melt viscosities of the wholly aromatic liquid crystalline polyester resin compounds prepared in Examples 1-2 and Comparative Examples 1-2 were measured using a capillary viscometer at about 380° C. and 1000/s. The results are shown in Table 1 below.

(Measurement of Tensile Strength)

Tensile strengths of the wholly aromatic liquid crystalline polyester resin compounds prepared in Examples 1-2 and Comparative Examples 1-2 were measured based on ASTM D638. The results are shown in Table 1 below.

(Measurement of Heat Distortion Temperature)

Heat distortion temperatures (HDTs) of the wholly aromatic liquid crystalline polyester resin compounds prepared in Examples 1-2 and Comparative Examples 1-2 were measured based on ASTM D648. The results are shown in Table 1 below.

(Observation Whether Gassing from Resin Compound Occurred During Injection Molding and Carbonization of Injection Molded Product Occurred.)

In preparing specimens from the wholly aromatic liquid crystalline polyester resin compounds prepared in Examples 1-2 and Comparative Examples 1-2 using an injection molder (FANUC ROBOSHOT 2000i-50B) for the measurement of tensile strength based on ASTM D638 and HDT based on ASTM D648, whether gassing occurred during the preparation and whether carbonization of the specimens (i.e., injection molded products) occurred were observed. The results are shown in Table 1 below. In Table 1, ○ indicates occurrence of gassing or carbonization of specimens, and X indicates non-occurrence of gassing or carbonization of specimens.

TABLE 1

| | Bumping | Melt viscosity (Pa·s) | Tensile strength (MPa) | HDT (°C.) | Gassing during injection molding/ Carbonization of specimens |
|---|---|---|---|---|---|
| Example 1 | X | 50 | 120 | 260 | X/X |
| Example 2 | X | 49 | 117 | 258 | X/X |
| Comparative Example 1 | X | 39 | 110 | 246 | ○/○ |
| Comparative Example 2 | ○ | 42 | 114 | 150 | ○/○ |

Referring to Table 1, in preparing the wholly aromatic liquid crystalline polyester resins of Examples 1 and 2, bumping did not occur when the internal pressure of the reaction vessel was reduced during the preparation, melt viscosities, tensile strengths, and HDTs of the resin compounds prepared therefrom were all high, and neither gassing during injection molding of each resin compound nor carbonization of the injection molded products did occur. These results are attributed to the fact that sufficient removal of the byproduct and unreacted monomers from the contents of the reaction vessel due to the reduced internal pressure of the reaction vessel facilitated sufficient condensation and polymerization, so that the wholly aromatic liquid crystalline polyester resins had high degrees of polymerization.

In preparing the wholly aromatic liquid crystalline polyester resin of Comparative Example 1, although no bumping occurred in the reduced internal pressure state of the reaction vessel during the preparation, a resin compound prepared therefrom was found to be lower in melt viscosity, tensile strength, and HDT as compared with the resin compounds of Examples 1 and 2, and gassing from the resin compound occurred during the injection molding, and carbonization occurred in an injection molded product prepared therefrom. These results are attributed to the fact that the pressure reduction rate was so slow to lead to termination of condensation polymerization with the byproduct and unreacted monomers remaining unremoved from the contents of the reaction vessel, and thus resulted in the wholly aromatic liquid crystalline polyester resin having a low degree of polymerization.

In preparing the wholly aromatic liquid crystalline polyester resin of Comparative Example 2, bumping occurred in the reduced internal pressure state of the reaction vessel during the preparation, a resin compound prepared therefrom was found to be lower in melt viscosity, tensile strength, and HDT as compared with the resin compounds of Examples 1 and 2 and Comparative Example 1, and gassing from the resin compound occurred during the injection molding, and carbonization occurred in an injection molded product prepared therefrom. These results are attributed to the fact that the pressure reduction rate was so fast to lead to bumping in the reaction vessel, and termination of condensation polymerization with the byproduct and unreacted monomers remaining unremoved from the contents of the reaction vessel, and thus resulted in the wholly aromatic liquid crystalline polyester resin with a low degree of polymerization.

As described above, according to the one or more embodiments of the present disclosure, a method of preparing a wholly aromatic liquid crystalline polyester resin may include, after synthesis of a wholly aromatic liquid crystalline polyester prepolymer by condensation polymerization from monomers, reducing an internal pressure of a reaction vessel containing the synthesized prepolymer at a predetermined internal pressure reduction rate. As a result, a byproduct and unreacted monomers are sufficiently removed so that the synthesized wholly aromatic liquid crystalline polyester resin may have a high degree of polymerization. Furthermore, additional polymerization of the prepolymer is unnecessary. Gassing from the resin is less likely to occur during a post-process such as extrusion or injection molding, and carbonization of a molded product prepared from the resin is prevented. The present disclosure also provides a wholly aromatic liquid crystalline polyester resin prepared using the method, and a wholly aromatic liquid crystalline polyester resin compound including the wholly aromatic liquid crystalline polyester resin.

The invention claimed is:

1. A method of preparing wholly aromatic liquid crystalline polyester resin, the method comprising:
   synthesizing a wholly aromatic liquid crystalline polyester prepolymer by condensation polymerization of at least two different monomers; and
   reducing an internal pressure of a reaction vessel containing the prepolymer to remove a byproduct and unreacted monomers and lead to condensation polymerization of the prepolymer, thereby synthesizing the wholly aromatic liquid crystalline polyester resin, wherein an internal pressure reduction rate of the reaction vessel is in a range of about 17 torr/min to about 20 torr/min, wherein the reaction vessel is equipped with an agitator, and a time for which the reduced internal pressure of the reaction vessel is maintained is controlled based on a torque value of the agitator, wherein the reduced internal pressure state of the reaction vessel is released when the torque value of the agitator reaches about 5 N·m to about 6N·m.

2. The method of claim 1, wherein, in the reducing of the internal pressure of the reaction vessel, a temperature of the reaction vessel is in a range of about 350~400° C.

3. A wholly aromatic liquid crystalline polyester resin not containing unreacted monomers, wherein the wholly aromatic liquid crystalline polyester resin is prepared by the method of claim 1.

4. A wholly aromatic liquid crystalline polyester resin compound comprising the wholly aromatic liquid crystalline polyester resin of claim 3.

* * * * *